(12) United States Patent
Stutz et al.

(10) Patent No.: US 9,366,156 B2
(45) Date of Patent: Jun. 14, 2016

(54) AXIAL SEALING GRAVITY BASED SIPHON SYSTEM

(71) Applicant: United Technologies Corporation, Hartford, CT (US)

(72) Inventors: Robert C. Stutz, Dobbs Ferry, NY (US); Jacob Peter Mastro, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 902 days.

(21) Appl. No.: 13/629,736

(22) Filed: Sep. 28, 2012

(65) Prior Publication Data

US 2014/0093356 A1    Apr. 3, 2014

(51) Int. Cl.
*F02C 7/06* (2006.01)
*F01D 25/18* (2006.01)
*F01D 25/34* (2006.01)
*F16H 57/04* (2010.01)

(52) U.S. Cl.
CPC ............... *F01D 25/18* (2013.01); *F01D 25/34* (2013.01); *F02C 7/06* (2013.01); *F16H 57/045* (2013.01); *F16H 57/0443* (2013.01); *F16H 57/0495* (2013.01); *F05D 2260/53* (2013.01); *Y10T 74/19642* (2015.01)

(58) Field of Classification Search
CPC ... F16K 17/36; F16H 57/045; F16H 57/0443; F16H 57/0495; Y10T 137/0753; Y10T 137/0874; Y10T 137/0898; F02C 7/06; F01D 25/18; F01D 25/34
USPC ...................................... 37/38–46
See application file for complete search history.

(56) References Cited

U.S. PATENT DOCUMENTS

| | | | |
|---|---|---|---|
| 4,153,141 A | 5/1979 | Methlie | |
| 4,203,458 A | 5/1980 | Barrett et al. | |
| 4,373,421 A | 2/1983 | Camboulives et al. | |
| 4,813,445 A * | 3/1989 | Lu | B64D 37/22 |
| | | | 137/264 |
| 5,472,383 A | 12/1995 | McKibbin | |
| 6,223,616 B1 | 5/2001 | Sheridan | |
| 6,463,819 B1 | 10/2002 | Rago | |
| 7,387,189 B2 | 6/2008 | James et al. | |

(Continued)

FOREIGN PATENT DOCUMENTS

| EP | 1925856 A2 | 5/2008 |
|---|---|---|
| EP | 2166196 | 3/2010 |

OTHER PUBLICATIONS

International Preliminary Report on Patentability for PCT Application No. PCT/US2013/061099, mailed on Apr. 9, 2015.

(Continued)

*Primary Examiner* — Craig Kim
*Assistant Examiner* — Maxime Adjagbe
(74) *Attorney, Agent, or Firm* — Carlson, Gaskey & Olds, P.C.

(57) ABSTRACT

A lubrication system for a fan drive gear system includes a lubricant supply and a collection conduit for drawing lubricant from within the lubricant supply. The collection conduit includes a first opening and a second opening for withdrawing lubricant and supplying lubricant to a pump. During normal operation lubricant may be drawn through both first and second openings. During negative G operating conditions a fitting at the second opening blocks the second opening to prevent air from being drawn into the lubricant system and communicated to the pump.

16 Claims, 4 Drawing Sheets

(56) References Cited

U.S. PATENT DOCUMENTS

| | | |
|---|---|---|
| 8,020,665 B2 | 9/2011 | Sheridan et al. |
| 8,181,746 B2 | 5/2012 | Szolomayer et al. |
| 8,215,454 B2 | 7/2012 | Portlock et al. |
| 2008/0116010 A1 | 5/2008 | Portlock et al. |
| 2010/0105516 A1* | 4/2010 | Sheridan ............ F01D 25/18 475/346 |
| 2010/0126589 A1 | 5/2010 | Angst |
| 2010/0294371 A1 | 11/2010 | Parnin et al. |
| 2010/0294597 A1 | 11/2010 | Parnin |
| 2011/0108360 A1 | 5/2011 | DiBenedetto |
| 2014/0064908 A1* | 3/2014 | Grillo ............ F01M 11/067 415/1 |

OTHER PUBLICATIONS

International Search Report and Written Opinion for PCT Application No. PCT/US2013/061099 mailed on Dec. 17, 2013.

European Search Report for EP Application No. 13842977.4 dated Feb. 12, 2016.

* cited by examiner

AXIAL SEALING GRAVITY BASED SIPHON SYSTEM

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

The speed reduction device requires a constant supply of lubricant throughout the operational cycle of an aircraft. Accordingly, a lubricant supply system includes features for maintaining lubricant supply to the speed reduction device during negative G maneuvering. Turbine engine manufacturers continue to seek further improvements to engine performance including improvements to lubricant supply systems that supply lubricant to the speed reduction system.

SUMMARY

A lubrication system for a fan drive gear system according to an exemplary embodiment of this disclosure, among other possible things includes a lubricant supply, and a collection conduit for drawing lubricant from within the lubricant supply. The collection conduit includes a first opening and a second opening for withdrawing lubricant during a first condition. The first opening provides for withdrawal of lubricant during a second condition. A fitting at the second opening allows lubricant flow during the first condition and preventing lubricant flow during the second condition.

In a further embodiment of the foregoing lubrication system, the second opening is spaced a distance apart from the first opening.

In a further embodiment of any of the foregoing lubrication systems, the first opening is disposed at an end of the collection conduit and the second opening is disposed at an intermediate location along the conduit.

In a further embodiment of any of the foregoing lubrication systems, the fitting includes a plurality of openings selectively blocked responsive to the second condition.

In a further embodiment of any of the foregoing lubrication systems, includes a flange including the plurality of openings and a seal plate movable into contact with the flange for blocking lubricant flow through the plurality of openings.

In a further embodiment of any of the foregoing lubrication systems, the flange is attached to a tube, and the seal plate is movable along the tube.

In a further embodiment of any of the foregoing lubrication systems, the flange extends outward from the tube and a cap is attached to the flange for communicating lubricant to the plurality of openings within the flange.

In a further embodiment of any of the foregoing lubrication systems, the first opening and the second opening are submerged in lubricant in the first condition, and only the first opening is submerged in lubricant in the second condition.

A fan drive gear system according to an exemplary embodiment of this disclosure, among other possible things includes an input gear, an output gear driven by the input gear, a lubricant supply, and a collection conduit for drawing lubricant from within the lubricant supply. The collection conduit includes a first opening and a second opening for withdrawing lubricant during a first condition. The first opening provides for withdrawal of lubricant during a second condition. A fitting at the second opening allows lubricant flow during the first condition and preventing lubricant flow during the second condition.

In a further embodiment of the foregoing fan drive gear system, the second opening is spaced a distance apart from the first opening.

In a further embodiment of any of the foregoing fan drive gear systems, the fitting includes a plurality of openings selectively blocked responsive to the second condition.

In a further embodiment of any of the foregoing fan drive gear systems, includes a flange including the plurality of openings and a seal plate movable into contact with the flange for blocking lubricant flow through the plurality of openings.

In a further embodiment of any of the foregoing fan drive gear systems, the flange is attached to a tube, and the seal plate is movable along the tube.

In a further embodiment of any of the foregoing fan drive gear systems, the flange extends outward from the tube and a cap is attached to the flange for communicating lubricant to the plurality of openings within the flange.

A gas turbine engine according to an exemplary embodiment of this disclosure, among other possible things includes a fan including a plurality of fan blades rotatable about an axis, a compressor section, a combustor in fluid communication with the compressor section, a turbine section in fluid communication with the combustor, a geared architecture driven by the turbine section for rotating the fan about the axis, and a lubricant system supplying lubricant to the geared architecture. The lubricant system includes a supply, and a collection conduit for drawing lubricant from within the lubricant supply. The collection conduit includes a first opening and a second opening for withdrawing lubricant during a first condition. The first opening provides for withdrawal of lubricant during a second condition. A fitting at the second opening allows lubricant flow during the first condition and preventing lubricant flow during the second condition.

In a further embodiment of the foregoing gas turbine engine, the fitting includes a plurality of openings selectively blocked responsive to the second condition.

In a further embodiment of any of the foregoing gas turbine engines, includes a flange including the plurality of openings and a seal plate movable into contact with the flange for blocking lubricant flow through the plurality of openings.

In a further embodiment of any of the foregoing gas turbine engines, the flange is attached to a tube, and the seal plate is movable along the tube.

In a further embodiment of any of the foregoing gas turbine engines, the second condition includes negative G operation.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
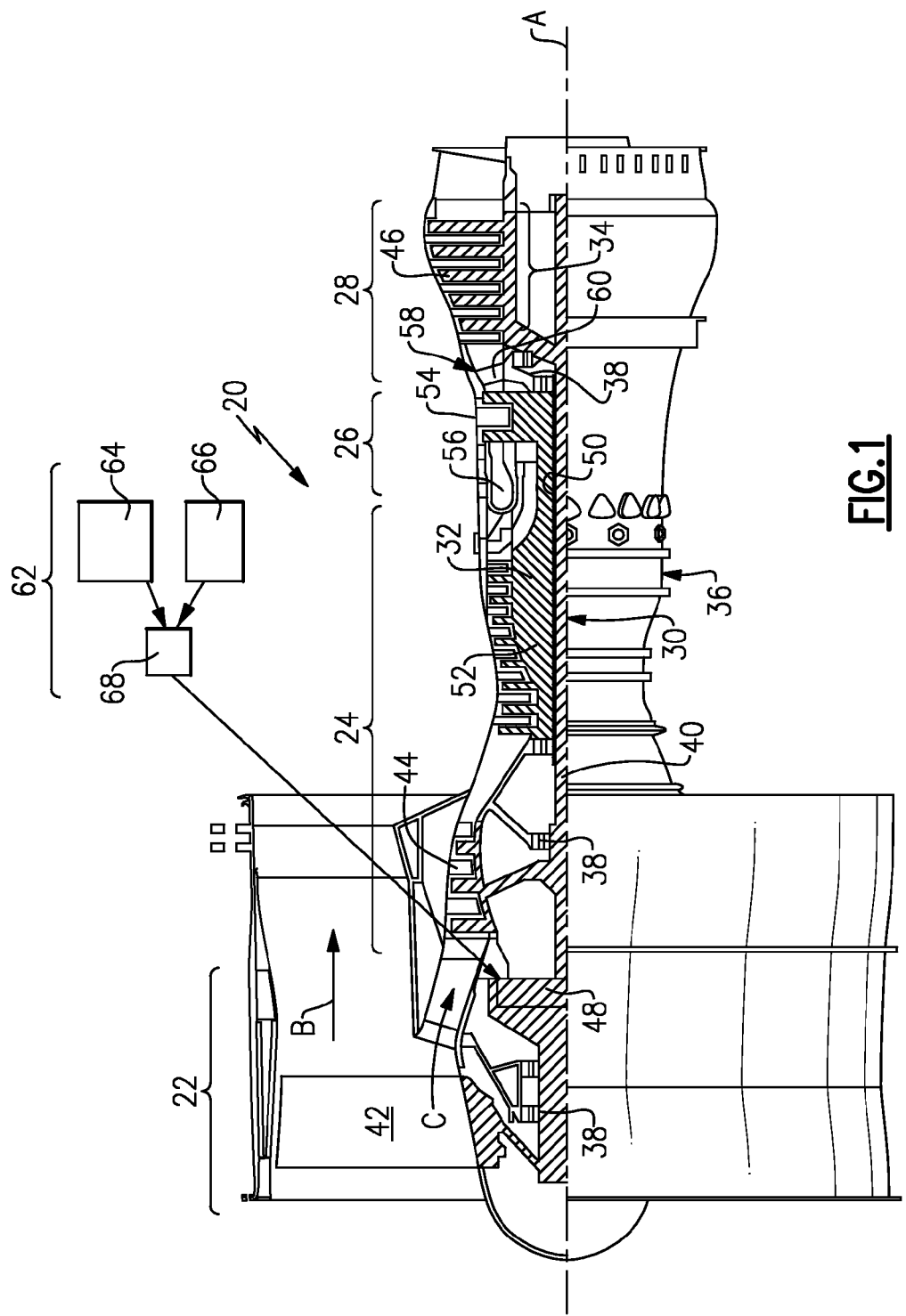
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram \ ° R)/(518.7° R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example gas turbine engine 20 includes a lubrication system 62. The lubrication system 62 provides oil to the geared architecture 48. In this example, the geared architecture 48 comprises a fan drive gear system that receives lubrication from the lubrication system 62. The example lubrication system 62 includes a main lubricant supply 64 and an auxiliary lubricant supply 66. The auxiliary lubricant supply 66 feeds a pump 68. The pump 68 drives lubricant to the fan drive gear system 48 to maintain lubrication during operational conditions of the gas turbine engine 20.

Figure 2:
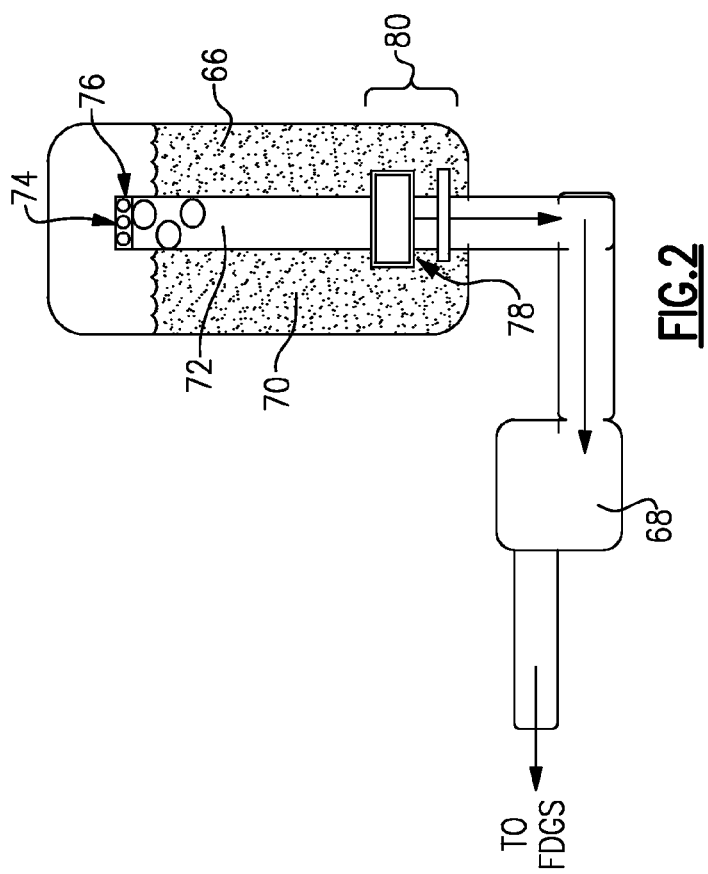
FIG. 2 is a schematic view of an example lubricant system in a normal operating condition.

Referring to FIG. 2, the fan drive gear system requires lubrication during all operational conditions of the aircraft. Accordingly in some instances where an aircraft is experiencing negative G forces lubricant may not be disposed within the main supply 64 such that a single inlet may draw lubricant.

During normal operation lubricant 70 settles to a bottom portion of the auxiliary supply 66. In this normal operating condition a conduit 72 that extends into the supply 66 for drawing lubricant 70 for the pump 68 may have an end 76 that is not submerged within lubricant 70. The first end 76 includes a first opening 74 to provide lubricant to the pump 68. If the first opening 74 is not submerged, lubricant may not be provided to the pump 68. Accordingly, the example disclosed conduit 72 includes a second opening 78 provided at a fitting 80 that is spaced apart from the first end 76.

During normal operation the second opening 78 is immersed in lubricant 70 where the first opening 74 may not be immersed in lubricant 70. Moreover, as lubricant 70 is exhausted from the supply 66 the first end 74 will further become uncovered and may undesirably draw air into the lubricant supply passages that supply the pump 68. However, the second opening 78 continues to draw and supply lubricant to the pump 68 during normal aircraft operating conditions.

Figure 3:
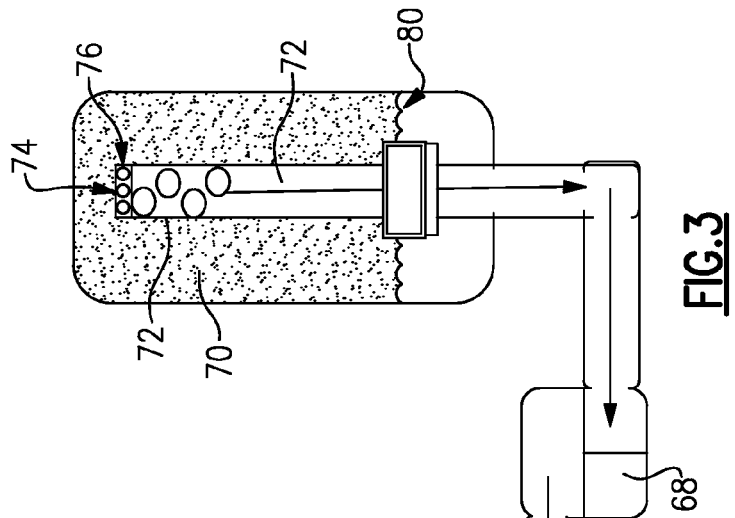
FIG. 3 is a schematic view of an example lubrication system in a negative G condition.

Referring to FIG. 3, the auxiliary supply 66 is illustrated in a negative G condition. In a negative G condition, the lubricant 70 is forced to a top portion of the supply 66. In this condition, lubricant 70 is communicated through the first opening 74. As appreciated, lubricant 70 is drawn to the top portion of the supply 66 in the negative G condition and away from the bottom portion previously submerging the fitting 80 and the second opening 74. The fitting 80 closes the second opening 78 in the negative G condition so that air is not communicated to the pump 68.

Figure 4:
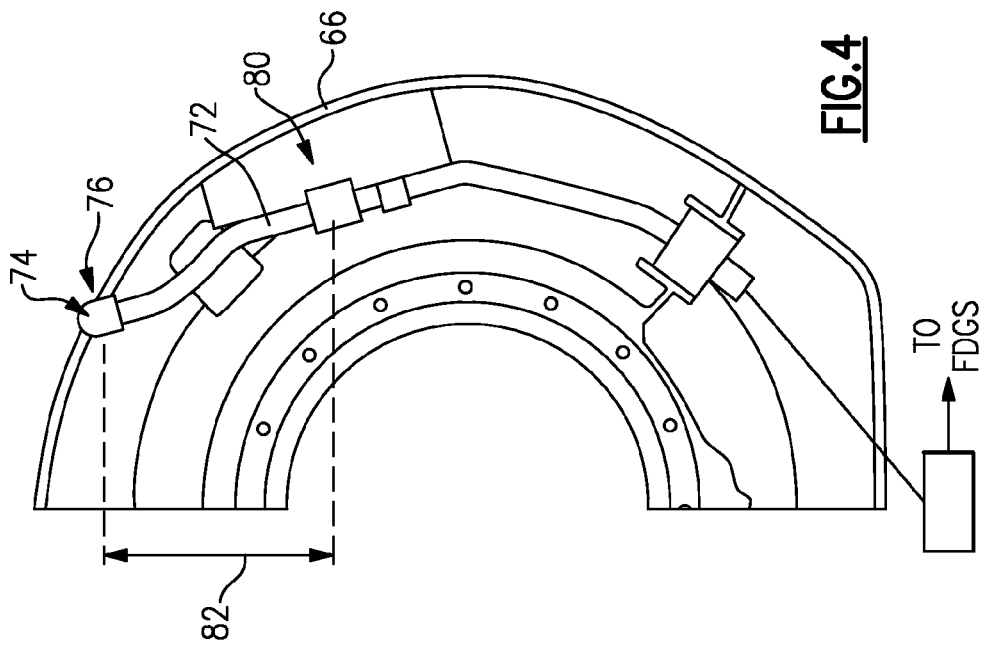
FIG. 4 is a partial view of an example auxiliary lubricant sump.

Referring to FIG. 4, the example auxiliary supply 66 is shown and includes the conduit 72 with the first end 76 having the first opening 74. The fitting 80 is spaced a distance 82 apart from the first end 76 such that a useful volume of lubricant can be drawn into the conduit 72 during normal operation. The conduit 72 supplies oil to the pump 68 which in turn supplies the fan drive gear system 48.

Figure 5:
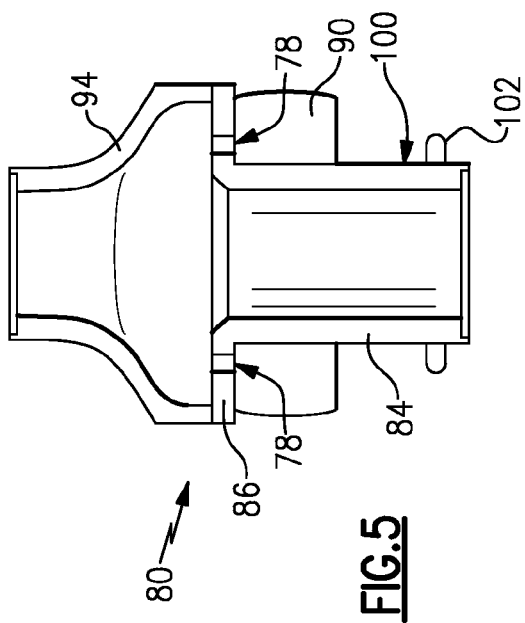
FIG. 5 is a sectional view of an example fitting in a closed position.
Figure 6:
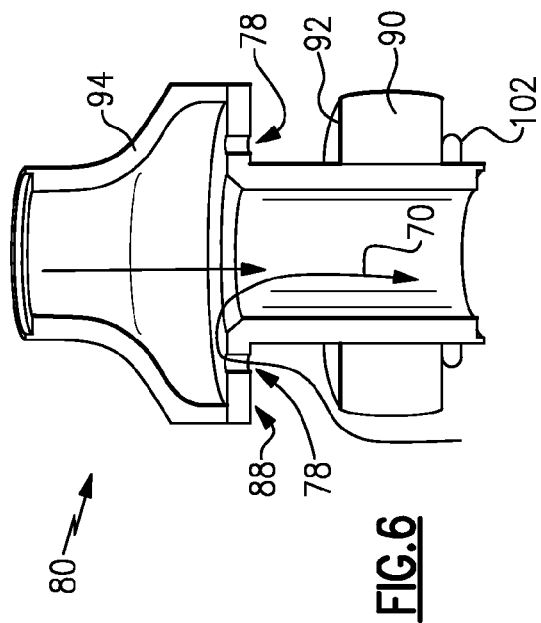
FIG. 6 is a cross-sectional view of the example fitting in an open position.
Figure 7:
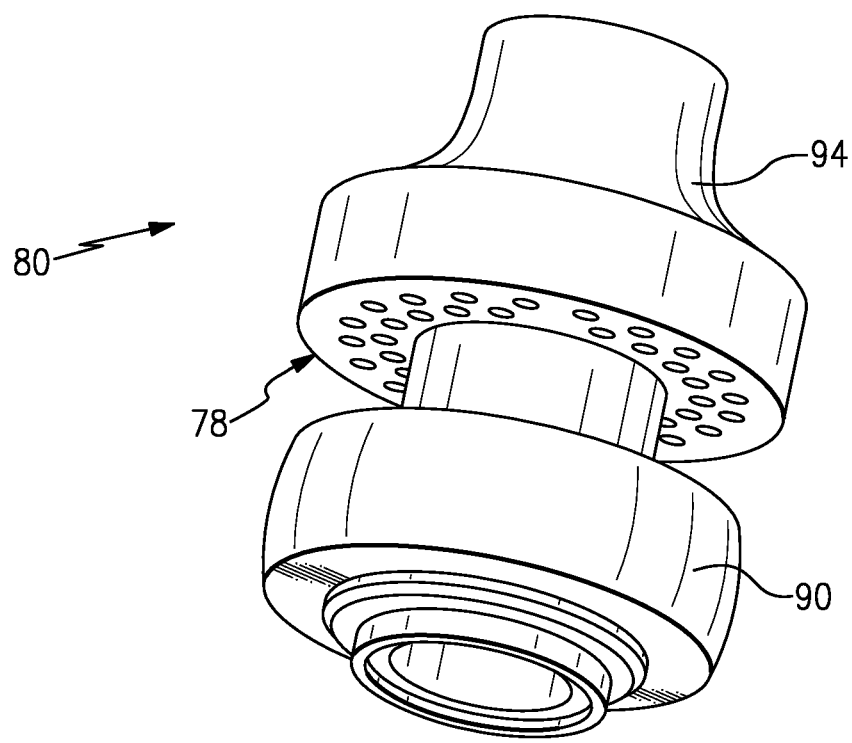
FIG. 7 is another perspective view of an outer surface of the example fitting in an open condition.

Referring to FIGS. 5, 6 and 7, the example fitting 80 includes a tube 84 with a flange 86. A plurality of second openings 78 are defined within the flange 86. A seal 90 is movable along an outer surface 100 of the tube 84 between a closed position illustrated here in FIG. 5 and an open position illustrated in FIG. 6. Bell mouth 94 is attached to the flange 86 and extends outwardly from the tube 84 to communicate lubricant drawn in through the second plurality of openings 78.

Seal 90 includes a seal surface 92 that abuts against a seal surface 88 defined within the flange 86. During operation, the seal 90 rests against a stop 102. The weight of the seal 90 will bias the seal 90 downward against the stop 102.

In conditions where negative G forces are encountered, the seal 90 moves against the flange 86 to seal against the surface 88. The seal surface 92 of the seal 90 blocks the openings 78 and prevents air from being drawn through the second openings 78. The example seal surface 92 can be flat surfaces that abut each other. Moreover, it is within the contemplation of this invention that the seal surface 92 may include other seal structure and materials to provide the desired sealing of lubricant through the second openings 78.

In this example, a plurality of second openings 78 are defined within the flange 86 and provide a desired flow area for lubricant into the fitting 80 and thereby into the conduit 72. Moreover, the bell mouth 94 extends outwardly onto the flange 86 to provide an annular area for receiving lubricant drawn through the second opening 78. Although the example fitting 80 includes a ring 96 that abuts against a flange 86 to block openings 78, the seal 96 could also be utilized to block openings that are disposed within the tube 84. Such operation would limit the flow of lubricant and air should the fitting be exposed in negative G conditions while allowing a sufficient flow of lubricant to the gear pump during normal operating conditions.

The example fitting provides for the communication of lubricant to a gear pump in both normal operating conditions and negative G operating conditions without drawing air through to the pump 68.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A lubrication system for a fan drive gear system comprising:
    a lubricant supply;
    a collection conduit for drawing a lubricant from within the lubricant supply, the collection conduit including a first opening and a second opening for withdrawing the lubricant during a first condition, wherein the first opening provides for withdrawal of the lubricant during a second condition; and
    a fitting at the second opening allowing a lubricant flow during the first condition and preventing the lubricant flow during the second condition, wherein the fitting includes a plurality of openings and a seal plate surrounding the conduit movable along an outer surface of the conduit to selectively block the plurality of openings.

2. The lubrication system as recited in claim 1, wherein the second opening is spaced a distance apart from the first opening.

3. The lubrication system as recited in claim 1, wherein the first opening is disposed at an end of the collection conduit and the second opening is disposed at an intermediate location along the conduit.

4. The lubrication system as recited in claim 1, wherein the plurality of openings are selectively blocked responsive to the second condition.

5. The lubrication system as recited in claim 4, including a flange extending outward the plurality of openings disposed within the flange and the seal plate movable into contact with the flange for blocking lubricant flow through the plurality of openings.

6. The lubrication system as recited in claim 5, wherein a bell mouth is attached to the flange providing an interface between the flange and the conduit for communicating the lubricant between the plurality of openings within the flange and the conduit.

7. The lubricant system as recited in claim 1, wherein the first opening and the second opening are submerged in lubricant in the first condition, and only the first opening is submerged in lubricant in the second condition.

8. A fan drive gear system comprising:
an input gear;
an output gear driven by the input gear;
a lubricant supply;
a collection conduit for drawing a lubricant from within the lubricant supply, the collection conduit including a first opening and a second opening for withdrawing the lubricant during a first condition, wherein the first opening provides for withdrawal of the lubricant during a second condition; and
a fitting at the second opening allowing a lubricant flow during the first condition and preventing the lubricant flow during the second condition, wherein the fitting comprises a plurality of openings and a seal plate surrounding the conduit and movable along an outer surface of the conduit for blocking the lubricant flow into the plurality of openings.

9. The fan drive gear system as recited in claim 8, wherein the second opening is spaced a distance apart from the first opening.

10. The fan drive gear system as recited in claim 8, wherein the plurality of openings are selectively blocked responsive to the second condition.

11. The fan drive gear system as recited in claim 10, including a flange extending outward the plurality of openings disposed within the flange and the seal plate is movable into contact with the flange for blocking lubricant flow through the plurality of openings.

12. The fan drive gear system as recited in claim 8, wherein a bell mouth is attached to the flange for communicating the lubricant to the plurality of openings within the flange.

13. A gas turbine engine comprising:
a fan including a plurality of fan blades rotatable about an axis;
a compressor section;
a combustor in fluid communication with the compressor section;
a turbine section in fluid communication with the combustor;
a geared architecture driven by the turbine section for rotating the fan about the axis;
a lubricant system supplying a lubricant to the geared architecture, the lubricant system including a supply, a collection conduit for drawing the lubricant from within the lubricant supply, the collection conduit including a first opening and a second opening for withdrawing the lubricant during a first condition, wherein the first opening provides for withdrawal of the lubricant during a second condition, and a fitting at the second opening allowing a lubricant flow during the first condition and preventing the lubricant flow during the second condition, wherein the fitting includes a plurality of openings and a seal plat surrounding the conduit movable along an outer surface of the conduit to selectively block the lubricant flow through the plurality of openings.

14. The gas turbine engine as recited in claim 13, wherein the plurality of openings are selectively blocked responsive to the second condition.

15. The gas turbine engine as recited in claim 14, including a flange including the plurality of openings and the seal plate is movable into contact with the flange for blocking lubricant flow through the plurality of openings.

16. The gas turbine engine as recited in claim 13, wherein the second condition comprises negative G operation.

* * * * *